(12) United States Patent
Yeh et al.

(10) Patent No.: US 7,916,490 B2
(45) Date of Patent: Mar. 29, 2011

(54) ELECTRONIC DEVICE ENCLOSURE

(75) Inventors: Chin-Wen Yeh, Taipei Hsien (TW); Zhi-Jian Peng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 391 days.

(21) Appl. No.: 12/109,316

(22) Filed: Apr. 24, 2008

(65) Prior Publication Data
US 2009/0154115 A1    Jun. 18, 2009

(30) Foreign Application Priority Data
Dec. 12, 2007    (CN) .................. 2007 2 0201613 U

(51) Int. Cl.
*H05K 5/00*    (2006.01)
(52) U.S. Cl. ........................................ 361/752; 361/810

(58) Field of Classification Search .......... 361/752–753, 361/790, 797, 800, 810, 679.01, 679.02, 361/679.4, 688, 689, 704, 759, 728–730, 361/748, 816, 757; 174/32, 350, 377, 382; 312/223.1, 223.2
See application file for complete search history.

(56) References Cited

U.S. PATENT DOCUMENTS

| 5,552,961 | A  | * | 9/1996  | Van Gaal et al. ............. 361/700 |
| 5,671,123 | A  | * | 9/1997  | Omori et al. .................. 361/737 |
| 6,058,024 | A  | * | 5/2000  | Lyford ......................... 361/816 |
| 6,157,538 | A  | * | 12/2000 | Ali et al. ....................... 361/704 |
| 6,445,588 | B1 | * | 9/2002  | Masterton et al. ............. 361/759 |
| 6,498,719 | B1 |   | 12/2002 | Bridges |
| 7,503,774 | B2 | * | 3/2009  | Yumi et al. ..................... 439/81 |

* cited by examiner

*Primary Examiner* — Hung S Bui
(74) *Attorney, Agent, or Firm* — Frank R. Niranjan

(57) ABSTRACT

The invention related to an electronic device enclosure that includes a chassis and a cover. The chassis includes a bottom wall, an opening and a circuit board mounted on the bottom wall. The cover is mounted on the chassis and is adapted to cover the opening of the chassis. A shock absorber is mounted on the cover and is resiliently resisted on the circuit board.

18 Claims, 5 Drawing Sheets

ELECTRONIC DEVICE ENCLOSURE

BACKGROUND

1. Technical Field

The present invention relates to an electronic device enclosure, and more particularly to an enclosure which can efficiently reduce shock and vibration to an electronic device.

2. Description of Related Art

Following the advancement in recent years of electronic technology, electronic devices, such as computers and DVD players, are designed to have more powerful functions from added electronic elements. Furthermore, as compact and portable electronic devices become more and more popular, these electronic devices become even more compact. In general, a small device having a large number of electronic elements is more vulnerable to physical damage when it endures shock or vibration. Therefore, various shock absorbers are used in these electronic devices to absorb shock and vibration in an effort to protect the devices from being damaged.

For example, U.S. Pat. No. 6,498,719 discloses a portable computer enclosure that can absorb shock. The enclosure includes a support wall and a strike zone including a first protrusion in the support wall. A support member is attached to the enclosure. The support member includes a base wall positioned in close proximity to the support wall of the enclosure. A second protrusion is formed in the base wall of the support member. The second protrusion is offset from the base wall by a first distance with at least a portion of the second protrusion being received within the first protrusion. A recess in the second protrusion is offset from the base wall by a second distance. The configuration of the strike zone reduces the magnitude of the shock. However, because the deformation of the strike zone is limited, the strike zone can't absorb all of the shock when the magnitude of the shock is too high. The potential for damaging the portable computer also exists.

What is needed, therefore, is an electronic device enclosure that can absorb a high magnitude of shock.

SUMMARY

An electronic device enclosure includes a chassis and a cover. The chassis includes a bottom wall and defines an opening. A circuit board is mounted on the bottom wall. The cover is mounted on the chassis and is adapted to cover the opening of the chassis. A shock absorber is mounted on the cover and resiliently resisted on the circuit board.

Other advantages and novel features of the present invention will become more apparent from the following detailed description of preferred embodiment when taken in conjunction with the accompanying drawings, in which:

DETAILED DESCRIPTION OF THE EMBODIMENT

Figure 1:
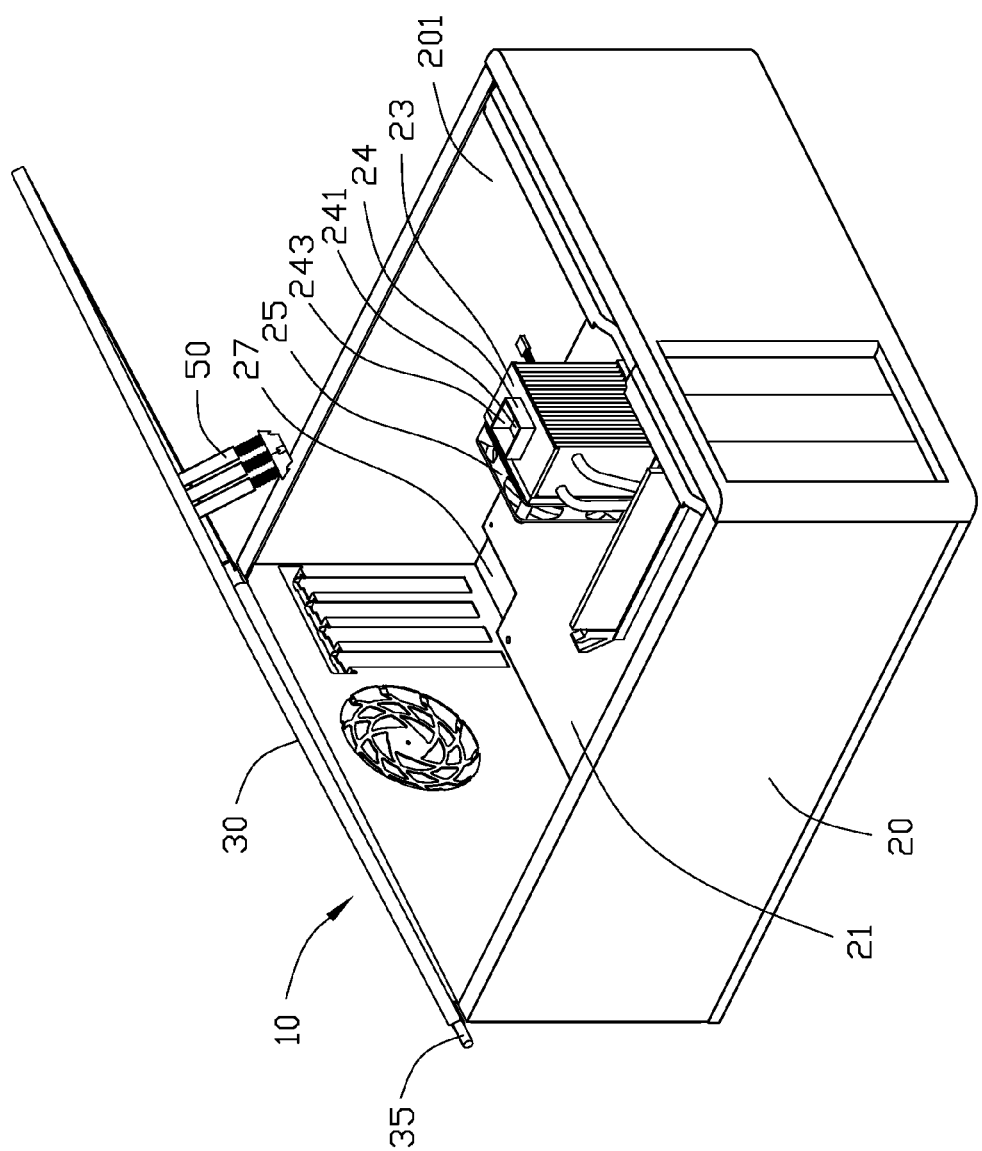
FIG. 1 is an isometric view of an electronic device enclosure in an open state, the electronic device enclosure having a shock absorber.

Referring to FIG. 1, an electronic device enclosure 10 in accordance with an exemplary embodiment of the present invention is shown. The electronic device includes a chassis 20 and a cover 30. The chassis 20 includes a bottom wall 27 at a bottom portion thereof, and defines an opening 201 at a top portion thereof. The cover 30 is pivotably mounted on the chassis 20 via an axis 35 adapted for covering the opening 201 of the chassis 20. A circuit board 21 is mounted on the bottom wall 27 of the chassis 20. The circuit board 21 comprises a chipset (not shown) that generates heat. A heat sink 23 is mounted on the circuit board 21 with a bottom of the heat sink 23 contacting the chipset to assist the chipset in dissipating heat. A fan 25 is mounted on a lateral side of the heat sink 23. A frame 24 is formed on a top side of the heat sink 23 and faces the opening 201. The frame 24 defines a recess 241 at a central portion therein. The recess 241 is surrounded by four slopes 243. A shock absorber 50 is mounted on the cover 30 corresponding to the frame 24 of the heat sink 23.

Figure 2:
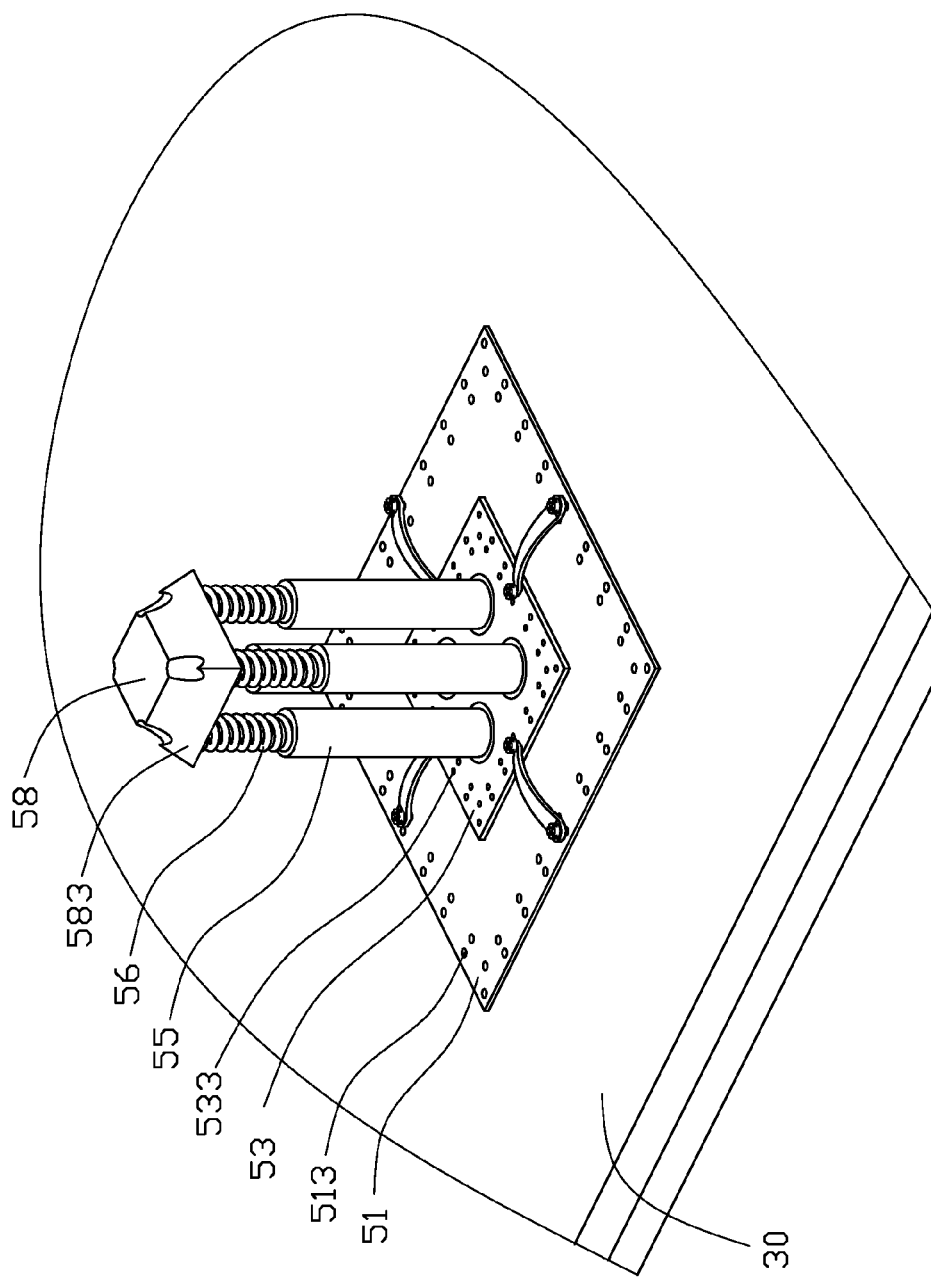
FIG. 2 is an isometric view of the shock absorber of FIG. 1.

Referring to FIG. 2, the shock absorber 50 includes a first piece 51 and a second piece 53. The first piece 51 defines a plurality of screw holes 513 therein, and the second piece 53 defines a plurality of screw holes 533 therein. The cover 30 defines a plurality of screw holes (not shown) corresponding to the screw holes 513 of the first piece 51. The first piece 51 can be mounted on different positions of the cover 30 with the screw holes 513 of the first piece 51 in alignment with different screw holes of the cover 30. The second piece 53 can be mounted on different positions of the first piece 51 with the screws holes 533 of the second piece 53 in alignment with different screw holes 513 of the first piece 51.

The second piece 53 forms four posts 55, each of which has a spring 56 mounted on the end thereof. A prism-shaped positioning block 58 is mounted on the free ends of the four springs 56 and adapted to be received in the recess 241. The positioning block 58 forms four inclined faces 583 corresponding to the slopes 243 of the frame 24.

Figure 3:
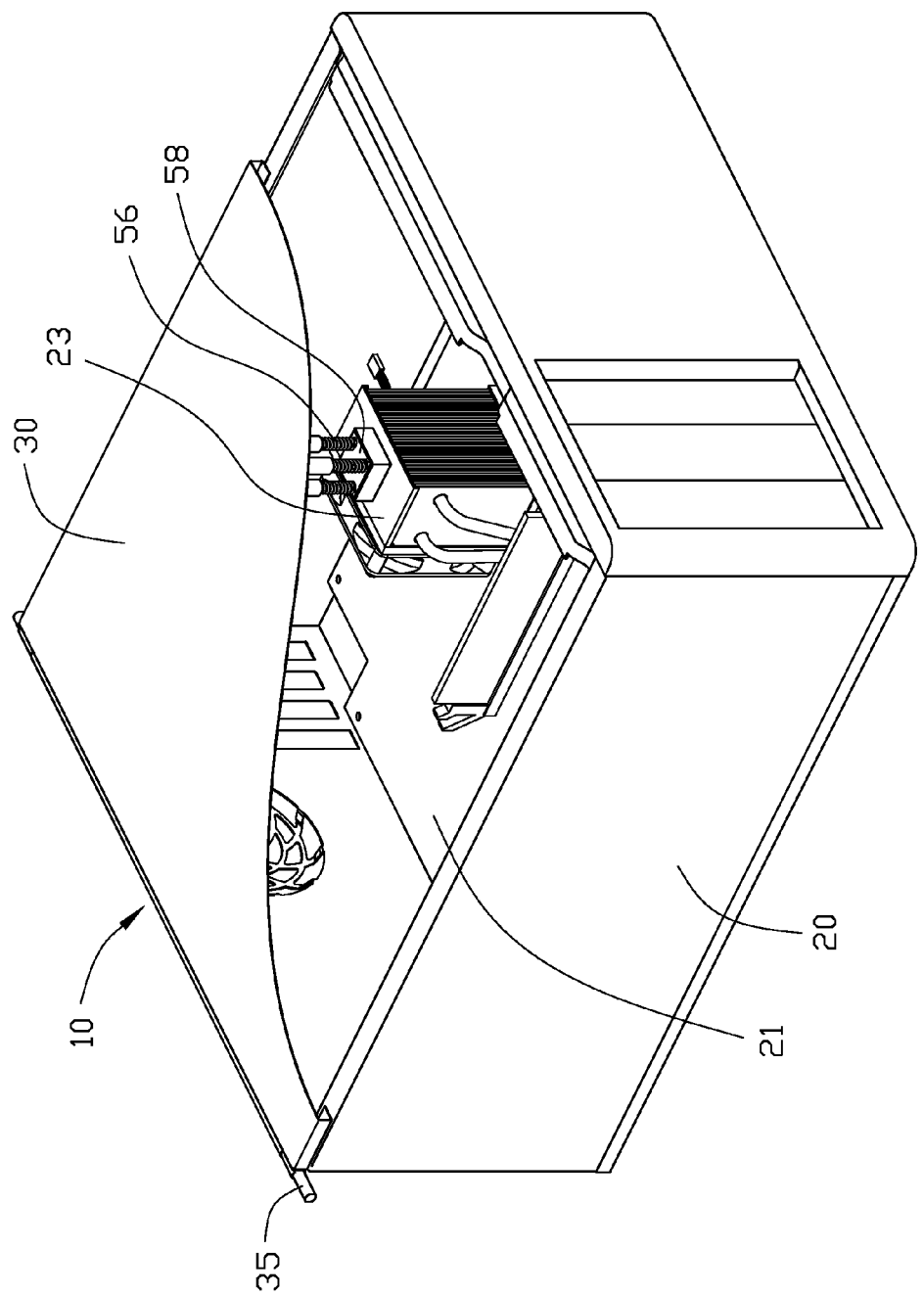
FIG. 3 is an isometric view of the electronic device enclosure of FIG. 1 in a closed state.

Referring to FIGS. 1, 2, and 3, the cover 30 rotates around the axis 35 to close the opening 201 of the chassis 20. The positioning block 58 of the shock absorber 50 is inserted into the recess 241 of the frame 24. The inclined faces 583 of the positioning block 58 resist against the slopes 243 of the frame 24. The cover 30 is locked to the chassis 20, and the springs 56 are slightly compressed between the frame 24 and the posts 55.

When the electronic device enclosure 10 is impacted, the shock and vibration of the circuit board 21 and the heat sink 23 is transmitted to the springs 56 via the frame 24 and the positioning block 58. The springs 56 are resiliently deformed to absorb the shock and vibration in an effort to protect the electronic device.

Figure 4:
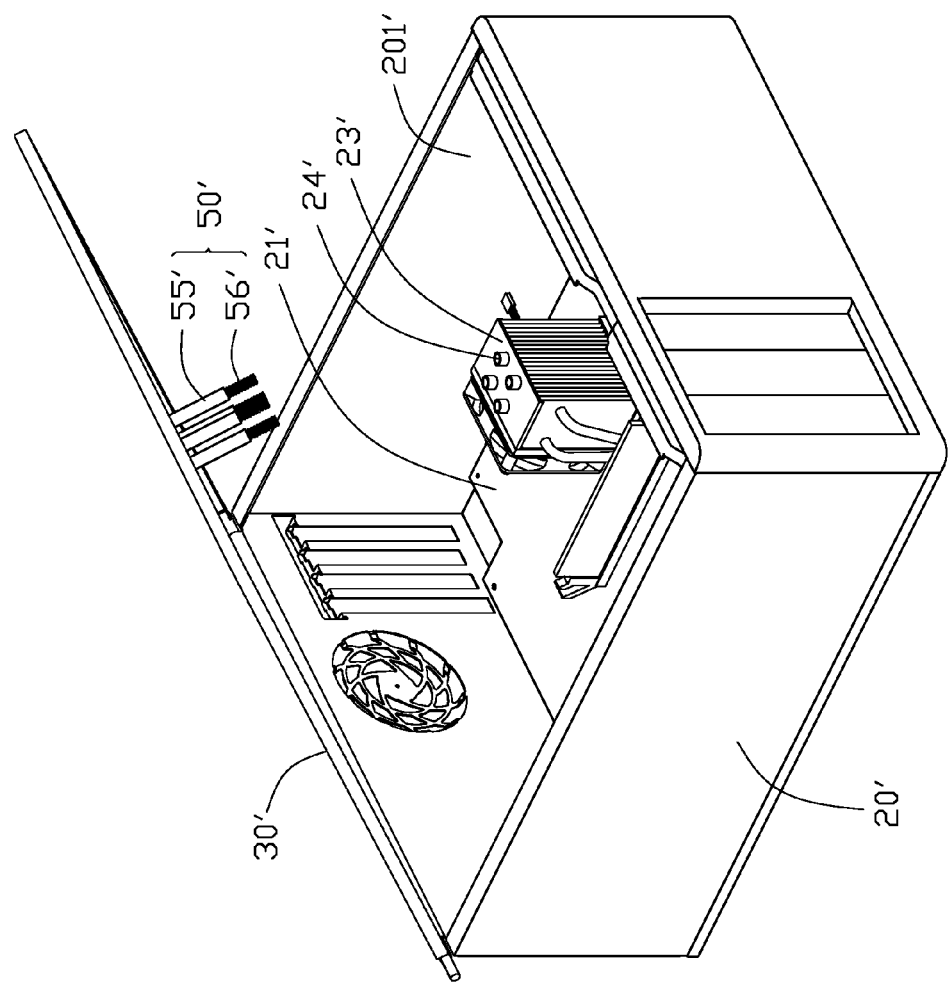
FIG. 4 is an isometric view of another electronic device enclosure in an open state, the electronic device enclosure having another shock absorber.
Figure 5:
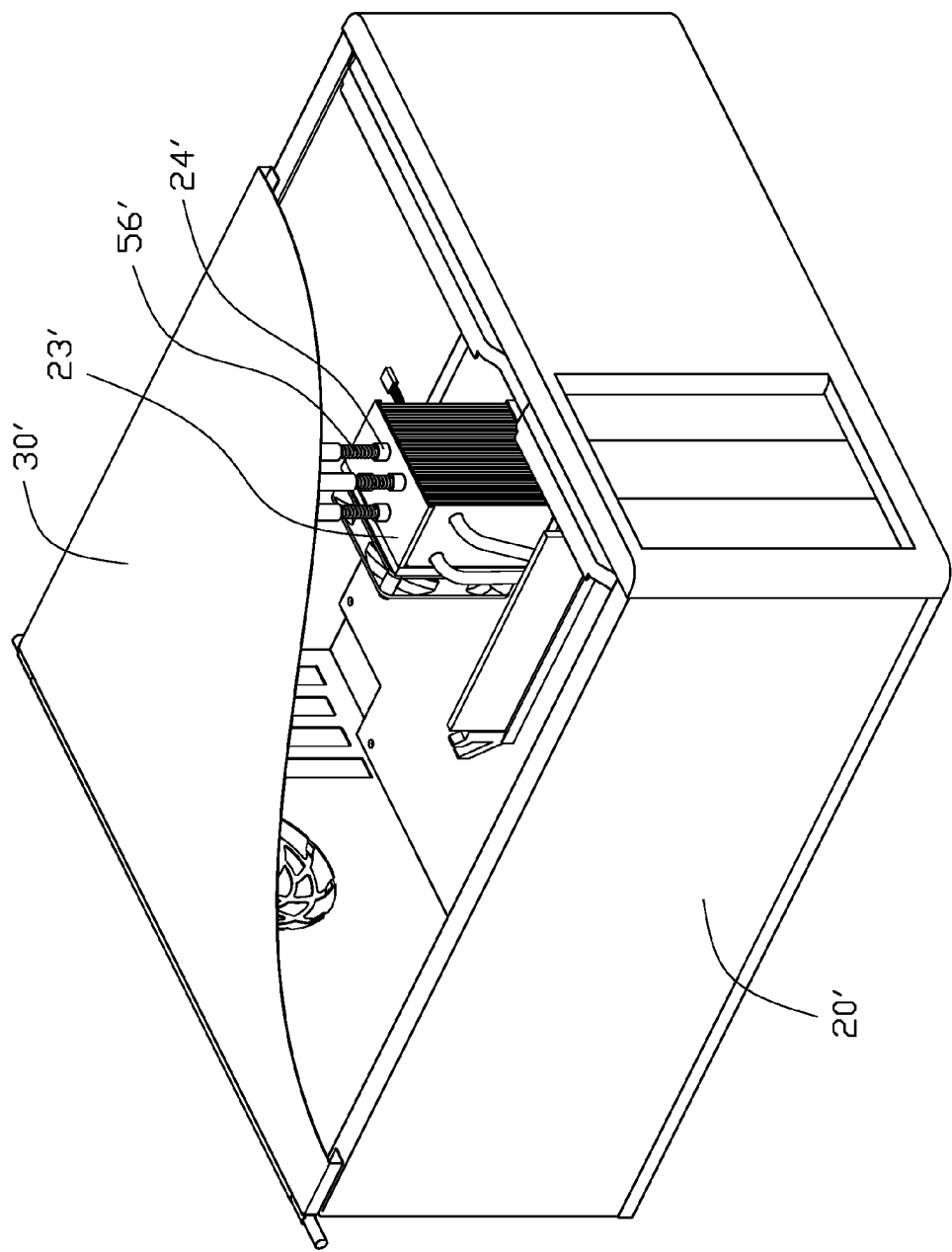
FIG. 5 is an isometric view of the electronic device enclosure of FIG. 4 in a closed state.

Referring to FIGS. 4 and 5, an electronic device enclosure in accordance with another exemplary embodiment of the present invention is shown. In this embodiment, the top side of the heat sink 23' forms four positioning holes 24'. Another shock absorber 50' is mounted on the cover 30' corresponding to the four positioning holes 24' of the heat sink 23'. The shock absorber 50' includes four posts 55', each of which has a spring 56' mounted on the end thereof. A diameter of the spring 56' is less than or equal to that of the positioning hole 24'. When the cover 30' rotates to close the opening 201' of the chassis 20', the springs 56' of the shock absorber 50' are inserted into the positioning holes 24'. The cover 30' is locked to the chassis 20', and the springs 56' are slightly compressed.

When the electronic device enclosure is impacted, the shock and vibration of the circuit board 21' and the heat sink 23' is transmitted to the springs 56'. The springs 56' are resiliently deformed to absorb the shock and vibration in an effort to protect the electronic device.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device enclosure, comprising:
   a chassis comprising a bottom wall, the chassis defining an opening, a circuit board mounted on the bottom wall; and
   a cover mounted on the chassis adapted to cover the opening of the chassis, a shock absorber mounted on the cover, and wherein the shock absorber is configured to apply force to the circuit board;
   wherein the shock absorber comprises a plurality of posts which is secured on the cover, each of the plurality of posts has a spring mounted on an end thereof, the shock absorber comprises a first piece and a second piece on which the plurality of posts is formed, each of the first piece, the second piece, and the cover defines a plurality of screw holes, the first piece is mounted on the cover, and the second piece is mounted on first piece.

2. The electronic device enclosure as described in 1, wherein the first piece is mounted on different positions of the cover with the screw holes of the first piece in alignment with different screw holes of the cover, and the second piece is mounted on different positions of the first piece with the screws holes of the second piece in alignment with different screw holes of the first piece.

3. The electronic device enclosure as described in claim 1, wherein a heat sink is mounted on the circuit board, the heat sink defines a plurality of positioning holes corresponding to the springs, and a free end of each spring is inserted in a hole to position the spring therein when the cover is in a closed position.

4. The electronic device enclosure as described in claim 3, wherein a diameter of the spring is less than or equal to that of the corresponding positioning hole.

5. The electronic device enclosure as described in claim 1, wherein a positioning block is secured on free ends of springs, a heat sink is mounted on the circuit board, the heat sink forms a frame thereon, the frame defines a recess therein, and the positioning block is located in the recess when the cover is in a closed position.

6. The electronic device enclosure as described in claim 5, wherein the frame forms a plurality of slopes, and the positioning block forms a plurality of inclined faces corresponding to the slopes, and the inclined faces resist against the slopes when the positioning block is located in the recess.

7. The electronic device enclosure as described in claim 1, wherein the cover is pivotably mounted on the chassis.

8. The electronic device enclosure as described in claim 1, wherein a heat sink is configured to receive one or more elements of the shock absorber.

9. An electronic device enclosure, comprising:
   a chassis comprising a bottom wall at a bottom side thereof and a cover mounted on a top side thereof facing to the bottom wall, a circuit board mounted on the bottom wall;
   a shock absorber sandwiched between the cover and the circuit board to absorb shocks of the circuit board;
   wherein the shock absorber comprises a plurality of posts which is secured on the cover, each of the plurality of posts has a spring mounted on an end thereof to apply force to the circuit board, a positioning block is secured on free ends of the springs, a heat sink is mounted on the circuit board, the heat sink forms a frame thereon, the frame defines a recess therein, and the positioning block is located in the recess when the cover is in a closed position.

10. The electronic device enclosure as described in claim 9, wherein the shock absorber comprises a first piece and a second piece on which the plurality of posts formed, each of the first piece, the second piece, and the cover defines a plurality of screw holes, the first piece is mounted on the cover, and the second piece is mounted on first piece.

11. The electronic device enclosure as described in claim 9, wherein the frame forms a plurality of slopes, and the positioning block forms a plurality of inclined faces corresponding to the slopes, and the inclined faces resist against the slopes when the positioning block is located in the recess.

12. The electronic device enclosure as described in claim 9, wherein the cover is pivotably mounted on the chassis.

13. The electronic device enclosure as described in claim 9, wherein a heat sink is configured to receive one or more elements of the shock absorber.

14. An electronic device enclosure, comprising:
   a chassis comprising a bottom wall at a bottom side thereof and a cover mounted on a top side thereof facing the bottom wall, a circuit board mounted on the bottom wall;
   a shock absorber sandwiched between the cover and the circuit board to absorb shocks of the circuit board;
   wherein the shock absorber comprises a plurality of posts which is secured to the cover, each of the plurality of posts has a spring mounted on an end thereof to apply force to the circuit board, a heat sink is mounted on the circuit board, the heat sink defines a plurality of positioning holes corresponding to the springs, and a free end of each spring is inserted in a hole to position the spring therein when the cover is in a closed position.

15. The electronic device enclosure as described in claim 14, wherein the shock absorber comprises a first piece and a second piece on which the plurality of posts is located, each of the first piece, the second piece, and the cover defines a plurality of screw holes, the first piece is mounted on the cover, and the second piece is mounted on first piece.

16. The electronic device enclosure as described in claim 14, wherein a diameter of each of the springs is less than or equal to that of the corresponding positioning hole.

17. The electronic device enclosure as described in claim 14, wherein the cover is pivotably mounted on the chassis.

18. The electronic device enclosure as described in claim 14, wherein a heat sink is configured to receive one or more elements of the shock absorber.

* * * * *